UNITED STATES PATENT OFFICE.

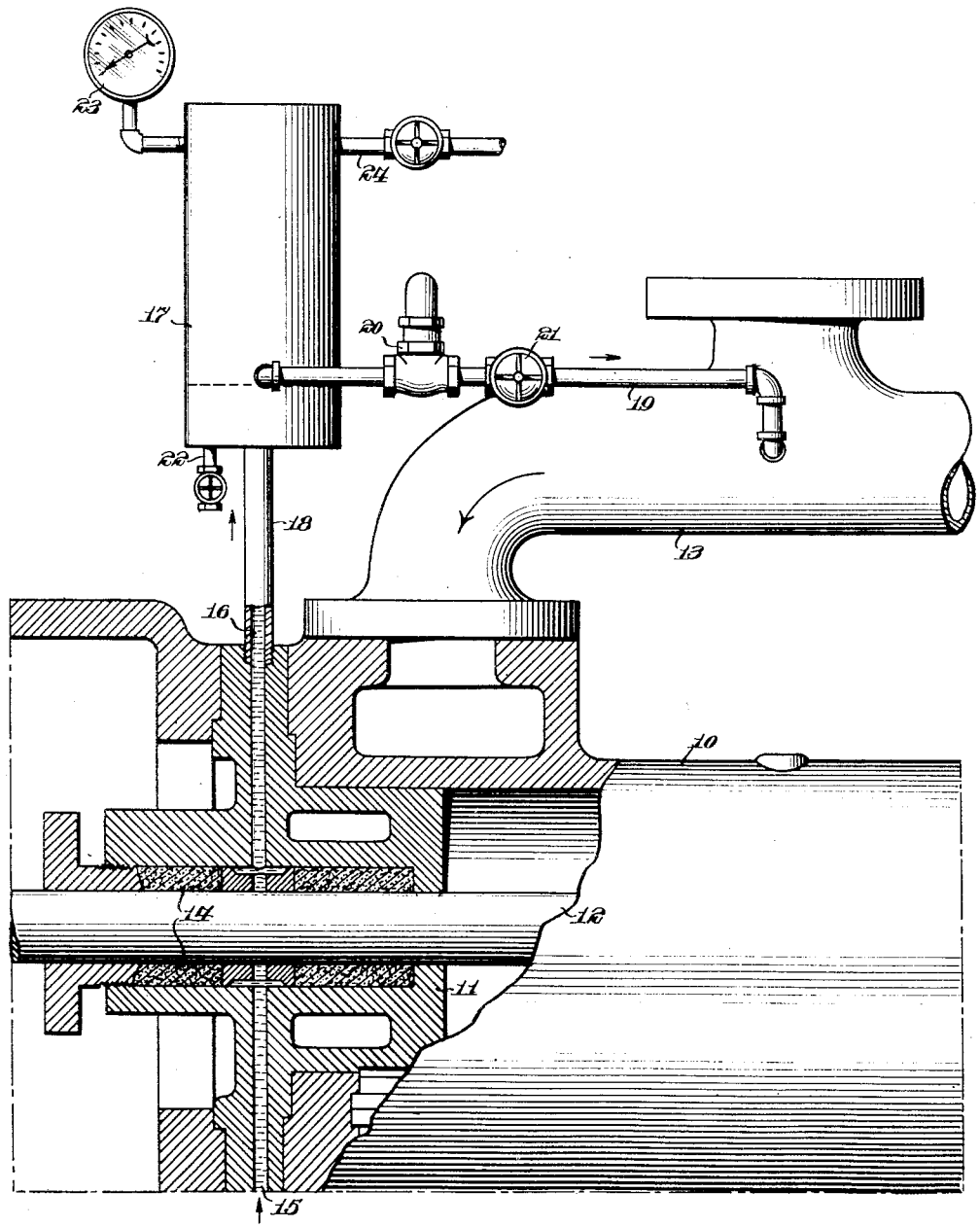

NICOLAI H. HILLER, OF CARBONDALE, PENNSYLVANIA.

PISTON-ROD-LUBRICATING SYSTEM.

1,371,308.  Specification of Letters Patent.  Patented Mar. 15, 1921.

Application filed January 15, 1920. Serial No. 351,689.

*To all whom it may concern:*

Be it known that I, NICOLAI H. HILLER, a citizen of the United States, and a resident of Carbondale, in the county of Lackawanna and State of Pennsylvania, have invented certain new and useful Improvements in Piston-Rod-Lubricating Systems, of which the following is a specification.

This is an improvement in lubricating systems for the piston rods of pumps, compressors and the like and particularly of those constructions in which there is a sub-atmospheric pressure in the cylinder during at least a part of one stroke, as the suction or intake stroke, and a super-atmospheric pressure during at least a part of the opposite stroke, as the delivery or compression stroke of the piston.

The invention is particularly applicable to ammonia compressors which draw in the ammonia gas from an expansion coil or other source at sub-atmospheric pressure and deliver it under pressure to the condenser or cooler. Any escape of the ammonia to the atmosphere is very objectionable and the admission, to the system, of air or other gas not readily liquefiable is equally objectionable.

The piston rods of ammonia compressors have been provided with stuffing boxes or packings lubricated by a supply of oil or other liquid lubricant delivered thereto and which is intended to serve also as a seal. According to one system this lubricant, which will hereinafter be referred to as oil, is pumped to the stuffing box and the excess or outflow is conducted to the compressor intake so as to enter the cylinder with the gas and lubricate the piston. The low pressure in the intake, particularly if the packing or stuffing be loose or worn, often causes the oil to be sucked out of the stuffing box so that the liquid seal is broken and air permitted to pass from the atmosphere along the piston rod into the cylinder and the system, or from the atmosphere along the rod to the oil outlet and with the oil into the system. During the pressure stroke the liquid in the stuffing box may be blown out and ammonia permitted to escape to the atmosphere.

The main object of my invention is to so control the flow of the lubricating and sealing liquid as to prevent the admission of air to the cylinder along the piston rod, or the escape of the gas or other fluid from the cylinder to the atmosphere. By means of my invention I am able to secure this object in a very simple, efficient, and inexpensive manner and without the necessity of making material changes in apparatus now in use and by adding a few simple and inexpensive parts.

As important features of my invention, I provide means whereby the excess or outflowing oil from the stuffing box may pass to the suction or intake of the compressor, but the sub-atmospheric pressure cannot act on the stuffing box. As another feature I provide an oil reservoir or supply chamber in communication with the stuffing box, and to which oil and gas may flow instead of to the atmosphere in case of leakage to the stuffing box from the cylinder, and from which oil may flow to the stuffing box in case of leakage along the rod from the stuffing box to the cylinder. As another feature I provide a supply of oil in communication with the intermediate portion of the stuffing box and under a substantially constant, comparatively low, super-atmospheric pressure, this pressure being such that oil may flow against it more easily, that the oil can escape to the outer end of the stuffing box, and also being such that it will supply oil to the stuffing box and prevent air from entering when there is a vacuum in the cylinder.

I am able to carry out my invention by merely adding a comparatively small reservoir and a pressure reducing valve in the ordinary oil pipe from the stuffing box to the compressor intake, although other means might be employed for carrying it out and within the scope of my invention.

In the accompanying drawing I have illustrated one embodiment of my invention, the view showing a portion of a compressor partly in section and partly in elevation. Although my invention is applicable to various types of horizontally or vertically mounted compressors or pumps, I have shown it in connection with a horizontal cylinder 10 having a cylinder head 11 through which extends the piston rod 12. In connection with the cylinder there is a supply or intake conduit 13 which, if the pump or compressor be double acting, connects to the opposite ends of the cylinder. As the details of construction of the compressor *per se* form no portion of my invention I have not fully illustrated these parts, or the intake and exhaust valves, or the exhaust or outlet conduit.

The cylinder head 11 has a stuffing box 14 to which lubricating oil is delivered through a duct 15 from a pump or other suitable source. I do not wish to be restricted to any particular type of stuffing box other than one satisfactorily tight and to or through which oil may be circulated for lubricating and sealing purposes. From this stuffing box there extends a duct 16 for excess or outflow oil. The ducts 15 and 16 are connected to the stuffing box chamber preferably at diametrically opposite points and intermediate of the ends of the packing.

As a preferred form of my invention I provide a small reservoir or chamber 17 located at a higher elevation than the stuffing box and connected to the duct 16 by a conduit 18. The reservoir is connected to the compressor intake by a pipe 19 which leads from a point materially above the bottom of the reservoir 17 so that a supply of oil may be maintained in the reservoir 17. In the conduit 19 I provide a relief valve 20 which may be set to open whenever the pressure in the reservoir 17 exceeds a predetermined limit. The details of construction of this valve are comparatively unimportant as any suitable form of construction may be employed which will serve the purpose. In practice this valve is ordinarily set so that it will not open to permit the escape of a liquid or gas from the reservoir 17 unless the pressure in the reservoir be one pound gage or higher. This pressure limit may be varied to suit different conditions, but preferably it is very low, that is, only slightly above atmospheric pressure. The valve 20 may be normally held closed by a weight, a spring, or other suitable means which will permit the valve to open when the limiting pressure is exceeded.

In connection with this construction I preferably provide the conduit 19 with an ordinary shut-off valve 21 and provide the reservoir with a simple form of valve controlled drain 22, a pressure indicating gage 23 and valve controlled connection 24 whereby the pressure in the reservoir 17 may be raised if materially below the desired limit, for instance, on starting. The conduit 24 may be connected to the condenser or to any other portion of the system in which a pressure above that of the atmosphere is ordinarily maintained. The conduit 18, the reservoir 17 and the conduit 19 constitute a back pressure connection. As the compressor works under low back pressure, there will ordinarily be a partial vacuum or sub-atmospheric pressure in the conduit 19 on the suction side of the valve 20.

In operation the lubricating and sealing oil is delivered through the duct 15 to the reservoir 17 and when the pressure in said reservoir exceeds the predetermined limit, for instance, one pound gage, and at the same time has accumulated above the inlet end of the conduit 19, it may escape past the valve 20 and pass into the compressor for piston lubrication. In the cylinder adjacent to the stuffing box there will be alternately a sub-atmospheric pressure during the suction or intake stroke and a super-atmospheric pressure during the compression or delivery stroke. During the suction stroke there will be a tendency of the oil to suck into the cylinder from the stuffing box and to leave the packing dry. As there is a reserve supply of oil in the reservoir 17 and it is under a pressure slightly above that of the atmosphere, oil will be supplied from the reservoir to the packing and the inflow of air from the atmosphere to the packing will be prevented. In other words, oil under one pound pressure will more quickly enter the stuffing box than can air enter from the atmosphere along the outer half of the packing. During the compression stroke there will be a tendency of the ammonia or other gas to escape from the cylinder along the packing. In case it flows out to the center of the packing, it can more easily flow up through the duct 16 against the one pound pressure of the reservoir than it can flow past the high friction and resistance of the outer half of the packing to the atmosphere. Thus the reservoir 17, under its low super-atmospheric pressure, acts to prevent any passage of air into the cylinder during the suction stroke and prevents the escape of any ammonia to the atmosphere during the compression stroke. It will, of course, be evident that there will be no tendency of the air to enter the stuffing box and pass up the duct 16 to the reservoir so long as this reservoir is maintained above atmospheric pressure. If, for any reason, the pressure in the reservoir falls below the desired limit, the valve in the conduit 24 may be opened to admit gas under pressure. If too much gas is admitted it will immediately escape past the valve 20 back to the compressor intake. If any difficulty is encountered in maintaining the desired pressure in the reservoir, the valve in the conduit 24 may be left open to a very slight extent or a pressure reducing valve may be used in this conduit so that gas will flow through the conduit 24 to the reservoir 17 at any time the pressure in the reservoir falls materially below the desired gage pressure.

Having thus described my invention what I claim as new and desire to secure by Letters Patent is:

1. A pump or compressor working under sub-atmospheric back pressure and having a piston rod stuffing box and a back pressure connection therefrom provided with a relief valve.

2. A pump or compressor working under sub-atmospheric back pressure and having a piston rod stuffing box and a back pressure connection therefrom provided with a relief valve operating to prevent the application of back pressure to the stuffing box.

3. A pump or compressor working under sub-atmospheric back pressure and having a piston rod stuffing box and a back pressure connection therefrom provided with a relief valve operating to maintain the stuffing box under super-atmospheric pressure.

4. A pump or compressor working under sub-atmospheric back pressure and having a piston rod stuffing box and a back pressure connection therefrom provided with a relief valve operating to maintain the stuffing box under comparatively low super-atmospheric pressure.

5. In combination a cylinder, an intake passage therefor, a piston rod stuffing box, means for supplying oil to said stuffing box and an outlet passage from the stuffing box having a pressure relief valve maintaining a comparatively low super-atmospheric pressure on the stuffing box, said outlet passage delivering to said intake passage.

6. In combination a cylinder, a piston rod stuffing box, means for supplying oil to the latter and an outlet passage from the stuffing box having a pressure relief valve maintaining a comparatively low super-atmospheric pressure on the stuffing box.

7. A pump or compressor working under sub-atmospheric back pressure and having a piston rod stuffing box, a back pressure connection therefrom including a reservoir and means for maintaining said reservoir under comparatively low super-atmospheric pressure.

8. A pump or compressor working under sub-atmospheric back pressure having a piston rod stuffing box, means for supplying oil thereto, and a back pressure connection from said stuffing box including a reservoir and a pressure relief valve.

9. A pump or compressor working under sub-atmospheric back pressure and having a piston rod stuffing box, means for supplying oil thereto, a reservoir receiving oil from said stuffing box and means for permitting the return of oil to the system at comparatively low super-atmospheric pressure.

10. A pump or compressor working under low back pressure and having a piston rod stuffing box and a back pressure connection therefrom including a reservoir connected to the stuffing box, and an outlet from a point above the bottom of the reservoir to the pump or compressor intake, said outlet including a pressure relief valve operating to maintain the pressure in said reservoir slightly above the back pressure of the pump or compressor.

11. A pump or compressor working under low back pressure and having a piston rod stuffing box, means for supplying oil thereto, a reservoir connected to said stuffing box, means for raising the pressure of said reservoir above that of the atmosphere and means for preventing said pressure rising above a predetermined limit.

12. A pump or compressor working under low back pressure and having a piston rod stuffing box and a back pressure connection therefrom, said connection including a reservoir, and means for maintaining the pressure of said reservoir above the back pressure of the pump or compressor.

13. An ammonia compressor working under sub-atmospheric back pressure and having a piston rod stuffing box, means for supplying oil thereto, a reservoir, connection between said reservoir and said stuffing box, connection between said reservoir and a high pressure part of the system and connection between said reservoir and the sub-atmospheric pressure portion of the system, said last mentioned connection including an automatic relief valve.

14. An ammonia compressor working under sub-atmospheric back pressure and having a piston rod stuffing box, means for supplying oil thereto, a reservoir, connection between said reservoir and said stuffing box, connection between said reservoir and a high pressure part of the system and connection between said reservoir and the sub-atmospheric pressure portion of the system, said last mentioned connection leading from a point above the bottom of said reservoir and including means preventing the application of sub-atmospheric pressure to said reservoir.

Signed at Carbondale in the county of Lackawanna and State of Pennsylvania this 12th day of January A. D. 1920.

NICOLAI H. HILLER.